(12) United States Patent
Womack

(10) Patent No.: US 8,275,230 B2
(45) Date of Patent: Sep. 25, 2012

(54) STACKABLE OPTICAL FIBER RETAINER

(75) Inventor: Wade James Womack, Allen, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 347 days.

(21) Appl. No.: 12/707,155

(22) Filed: Feb. 17, 2010

(65) Prior Publication Data

US 2010/0209068 A1 Aug. 19, 2010

Related U.S. Application Data

(60) Provisional application No. 61/153,615, filed on Feb. 18, 2009.

(51) Int. Cl.
*G02B 6/44* (2006.01)
(52) U.S. Cl. ........................................................ 385/137
(58) Field of Classification Search .................... 385/137
See application file for complete search history.

(56) References Cited

U.S. PATENT DOCUMENTS

| | | | |
|---|---|---|---|
| 4,655,489 A | 4/1987 | Bisbing | |
| 5,689,605 A | 11/1997 | Cobb | |
| 6,539,161 B2 * | 3/2003 | Holman et al. | 385/136 |
| 7,031,588 B2 | 4/2006 | Cowley | |
| 7,068,907 B2 | 6/2006 | Schray | |
| 2004/0099773 A1 | 5/2004 | Sono | |
| 2004/0240827 A1 | 12/2004 | Daoud | |
| 2007/0274645 A1 | 11/2007 | Murano | |

* cited by examiner

*Primary Examiner* — Jerry Rahll
(74) *Attorney, Agent, or Firm* — Muncy, Geissler, Olds & Lowe, PLLC

(57) ABSTRACT

An optical fiber retainer includes a first split band of material having a bottom, a top, a front and a back surrounding an interior passage, the front including a first portion depending from the top and having a bottom edge and a second portion extending from the bottom and including a top edge, the top edge and bottom edges comprising a first split of the first split band. The bottom includes an inner surface comprising a wall of the interior passage and an outer surface facing away from the interior passage, and the top includes an inner surface comprising a wall of the interior passage and an outer surface facing away from the interior passage. The bottom outer surface includes a first connector element, and the top outer surface includes a second connector element configured to releasably mate with another connector element of another split band.

21 Claims, 2 Drawing Sheets

STACKABLE OPTICAL FIBER RETAINER

CROSS-REFERENCE TO RELATED APPLICATIONS

The present application claims the benefit of U.S. Provisional Patent Application No. 61/153,615, filed Feb. 18, 2009, the entire contents of which are hereby incorporated by reference.

FIELD OF THE INVENTION

The present application is directed to a fiber retainer for a fiber management shelf, and, more specifically, toward a stackable fiber retainer for a fiber management shelf.

BACKGROUND OF THE INVENTION

Data centers that support one or more businesses, factories or residential areas typically comprise one or more racks or cabinets filled with interconnection sites for optical fibers and fiber optic cables. In a typical installation, fiber optic cables that include multiple optical fibers from an external source (these are often known as "outside plant" or "OSP" fibers) enter the cabinet and are spliced together with individual optical fibers known as "pigtails." Splicing typically occurs in a splice tray or similar component that includes multiple splice sites. The pigtail fibers are then connected within the cabinet to standard termination sites. The termination sites include termination ports that connect optically with "jumper" optical fibers or patch cords that exit the rack or cabinet to supply data or other information in optical form to the remainder of the building or site. The termination sites can be provided in a number of forms, including fiber distribution cartridges, fiber distribution modules, multi-position adapter couplers and/or bezels.

A support or trough may be provided on the fiber management shelf in front of the termination sites. Optical fibers from the termination sites are supported by this trough and may pass through one or more fiber retainer rings on the trough as they run toward one side of the fiber retainer shelf. Additional fiber retainer rings may be provided at each side of the trough for retaining bundles of optical fibers from a given row on the fiber management shelf and guiding them toward vertical bundles of fibers that run along the side of the fiber management shelve, especially when multiple fiber management shelves are arranged one above another in a rack. The fiber retainer rings at the sides of the shelves may be supported on the trough or attached to a vertical wall of the fiber management shelf.

Known optical fiber retainer rings are generally satisfactory. However, it would be desirable to provide an improved fiber retainer ring that can be mounted in a high density manner and that is configured to securely retain fibers passing therethrough and facilitate the insertion and removal of optical fibers therefrom when required.

SUMMARY OF THE INVENTION

These problems and others are addressed by the embodiments of the present invention, a first aspect of which comprises an optical fiber retainer that includes a first split band of material having a bottom, a top, a front and a back surrounding an interior passage through the first band from a first side of the first band to a second side of the first band. The front includes a front first portion depending from the top and having a bottom edge facing away from the top and a front second portion extending from the bottom and including a top edge facing away from the bottom, the top edge and bottom edge constituting a first split of the first split band. The bottom includes an inner surface comprising a wall of the interior passage and an outer surface facing away from the interior passage, and the top includes an inner surface comprising a wall of the interior passage and an outer surface facing away from the interior passage, while the bottom outer surface includes a first connector element and the top outer surface includes a second connector element configured to releasably mate with another connector element of another split band.

Another aspect of the invention comprises an optical fiber retainer that includes a first split band of material having a bottom, a top, a front and a back surrounding an interior passage through the first band from a first side of the first band to a second side of the first band. The front includes a front first portion depending from the top and having a bottom edge facing away from the top and a front second portion extending from the bottom and including a top edge facing away from the bottom. The top edge and bottom edge constitute a first split of the first split band. The back includes a back first portion depending from the top and having a bottom edge facing away from the top and a back second portion extending from the bottom and including a top edge facing away from the bottom, and the top edge and bottom edge of the back constitute a second split of the first split band. The back further includes a first fastener element on the back first portion and a second fastener element on the back second portion complementary to the first fastener element and releasably connecting the back first portion to the back second portion, and the first fastener element comprises a first one of a projection and a receiver and the second fastener element comprises the other of the projection and the receiver. The receiver comprises an opening having a side wall and a slot in the side wall, and the projection has a flange extending into the slot.

A further aspect of the invention comprises an optical fiber retainer that includes first and second split bands of material each of which includes a bottom, a top, a front and a back surrounding an interior passage through the band from a first side of the band to a second side of the band. The front includes a first portion depending from the top and having a bottom edge facing away from the top and a second portion extending from the bottom and including a top edge facing away from the bottom, and the top edge and bottom edge constitute a first split of the split band. The back includes a hinge mechanism for changing a separation between the front top edge and the front bottom edge. The bottom includes an inner surface comprising a wall of the interior passage and an outer surface facing away from the interior passage and the top including an inner surface comprising a wall of the interior passage and an outer surface facing away from the interior passage. The retainer also includes connector means for releasably connecting the first split band top to the second split band bottom.

BRIEF DESCRIPTION OF THE DRAWINGS

These and other aspects of embodiments of the invention will be better understood after a reading of the following detained description together with the attached drawings wherein.

DETAILED DESCRIPTION

Figure 1:
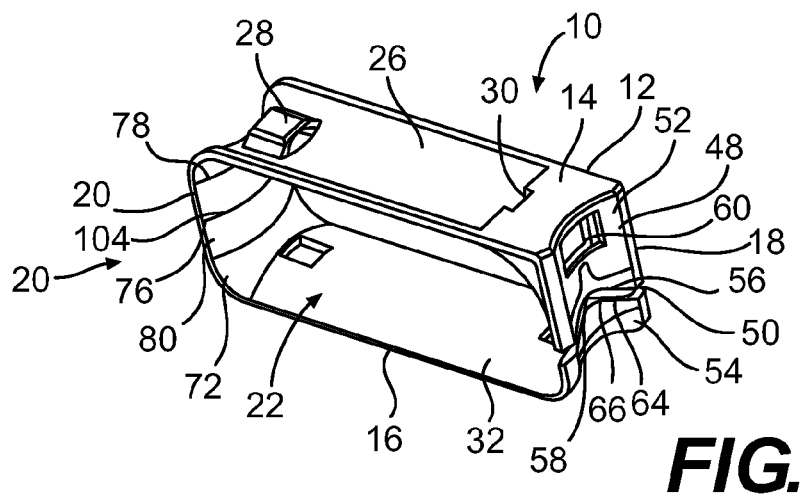
FIG. 1 is a front three-quarter perspective view of a fiber retainer according to an embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 illustrates a fiber retainer 10 comprising a split band 12 of material including a top 14, a bottom 16, a front 18 and a back 20 defining an interior passage 22 through the retainer 10. Top 14 comprises an inner surface 24, best seen in FIG. 4, that is convex, and an outer surface 26 having a bail 28 near retainer back 20 and a mounting opening 30 between bail 28 and retainer front 18. Bottom 16 of retainer 10 includes an inner surface 32 that is convex, and an outer surface 34, best seen in FIG. 4, that includes an L-shaped tab 36 near back 20 which L-shaped tab 36 includes a first leg 38 projecting from bottom 16 and a second leg 40 extending from first leg 38 in the direction of back 20. Bottom 16 also includes a second tab 42 having a barbed end 44. The second tab 42 is located between L-shaped tab 36 and retainer front 18. The convex inner surface 24 of top 14 and convex inner surface 32 of bottom 16, as well as convex inner portions of the retainer front 18 and retainer back 20 discussed below, form bend limiters that reduce the likelihood that an optical fiber passing through interior passage 22 will be bent beyond its minimum bend radius while passing through retainer 10.

Figure 2:
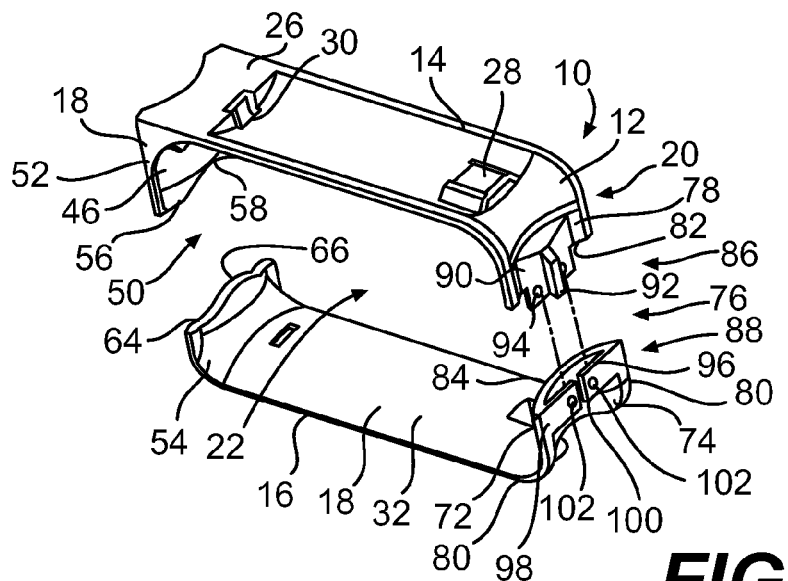
FIG. 2 is an exploded rear three-quarter perspective view of a fiber retainer of FIG. 1.

Front 18 of retainer 10 comprises a convex inner surface 46, illustrated in FIG. 2, and an outer surface 48. A first split 50 separates front 18 into a first portion 52 depending from top 14 and a second portion 54 extending from bottom 16. First portion 52 includes a bottom edge 56 having a concave end portion 58 and a mounting opening 60 holding a fastener element 62, which may comprise, for example, the receiver portion of a push-push fastener. Second portion 54 of retainer front 18 includes a top edge 64 with a convex end portion 66 that generally conforms to the shape of concave end portion 58 of front first portion 52. As can be seen in the sectional view of FIG. 5, concave end portion 58 includes a cutout 68 facing the interior passage 22, and convex end portion 66 includes a cutout 70 on the side facing away from interior passage 22. Convex end portion 66 extends behind concave end portion 58 forming an overlap, and this overlap helps retain optical fibers in interior passage 22 under normal conditions while providing a smoothly sloping surface that facilitates the insertion of optical fibers into interior passage 22 when first split 50 is opened as discussed hereinafter.

Referring now to FIG. 2, back 20 of retainer 10 includes a convex inner surface 72 and an outer surface 74. A second split 76 separates retainer back 20 into a first portion 78 depending from top 14 and a second portion 80 extending from bottom 16. Back first portion 78 includes a bottom edge 82, and second portion 80 has a top edge 84. Back first portion 78 includes a first connector element 86 for connecting back first portion 78 to a second connector element 88 on back second portion 80. First connector element 86 comprises a generally planar projection 90 extending away from first portion 78 which projection 90 includes a flange 92 extending from projection 90 in a direction away from interior passage 22. First and second bosses 94 are located on projection 90, one on either side of flange 92. Second connector element 88 comprises an opening 96 having a sidewall 98 with a slot 100 and first and second holes 102, one on either side of slot 100, configured to receive first and second bosses 94.

The first connector element 86 connects to second connector element 88 to attach first portion 78 of back 20 to the second portion 80 of back 20. Projection 90 of first connector element 86 is received in opening 96 of second connector element 88 and flange 92 extends into slot 100. Bosses 94 are received in holes 102 to create a snap-fit between the first connector element 86 and the second connector element 88. This connection forms a hinge 104 which hinge 104 permits first split 50 to open when the first portion 52 and second portion 54 of front 18 are pulled apart from each other. Bosses 94 and holes 102 help to maintain the connection between the first portion 78 and second portion 80 of back 20, while slot 100 allows projection 90 to move in opening 96 of second connector element 88 when the first portion 78 of the retainer back 20 bends relative to the second portion 80 of the retainer back 20.

Figure 3:
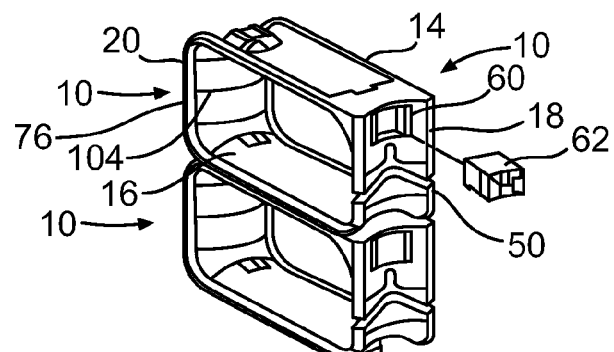
FIG. 3 is a front three-quarter perspective view of first and second stacked ones of the fiber retainers of FIG. 1.
Figure 4:
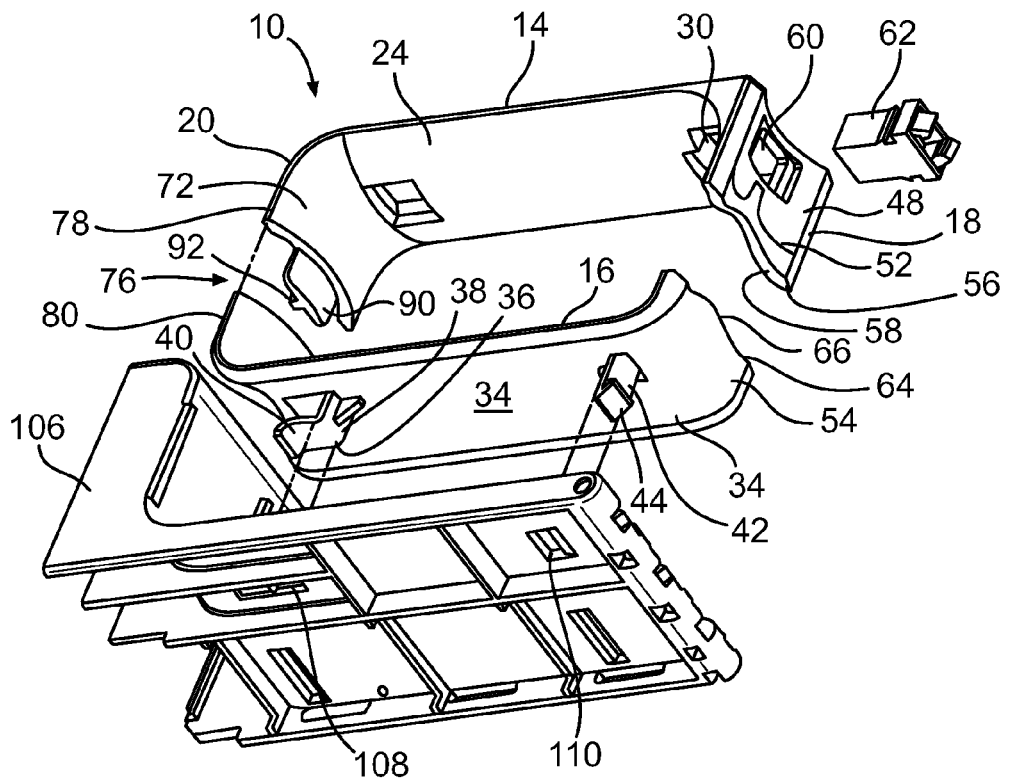
FIG. 4 is an exploded view of the fiber retainer of FIG. 1 showing the bottom of the retainer and a support to which the fiber retainer attaches.
Figure 5:
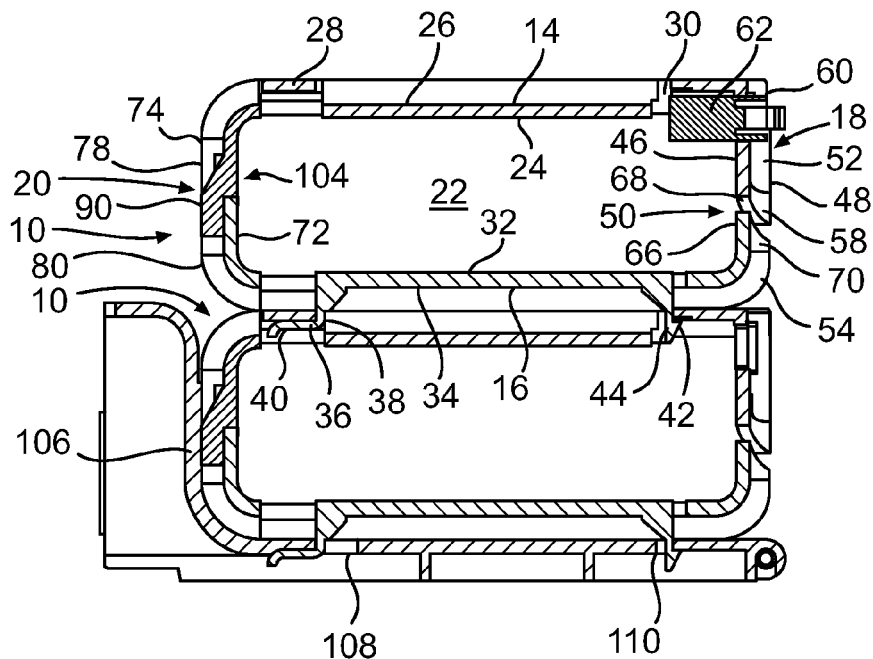
FIG. 5 is a sectional side view of the components of FIG. 4 in an assembled state.

FIGS. 4 and 5 illustrate a substrate 106 to which retainer 10 can be mounted as described below. Substrate 106 may comprise a portion of a fiber management shelf or a trough attached thereto (not illustrated), and the invention is not limited to mounting retainer 10 on any particular support. It is merely desirable that the support include a first mounting opening 108 and a second mounting opening 110 for accommodating the L-shaped tab 36 and second tab 42 of the retainer 16 of the retainer 10. To mount retainer 10 on substrate 106, second leg 40 of L-shaped tab 36 in inserted into first mounting opening 108 of substrate 106 until first leg 38 of the L-shaped tab 36 contacts a sidewall of the first mounting opening 108, and retainer 10 is pivoted to insert second tab 42 into second mounting opening 110 of substrate 106 until barbed end 44 of second tab 42 engages a wall adjacent to the second mounting opening 110 to secure retainer 10 to the substrate 106. A second retainer 10 can then be mounted on top 14 of the first retainer 10 by inserting the L-shaped tab 36 under the bail 28 on the retainer top 14 and pivoting the second retainer 10 until second tab 42 of the second retainer 10 enters the mounting opening 30 on top 14. Two retainers 10 stacked on top of one another without being attached to a substrate are illustrated in FIG. 3.

In use, a first retainer 10 is assembled and mounted on a support such as substrate 106, and additional retainers 10 are mounted on top of the first retainer 10 as necessary for a particular application. Patch cables (not illustrated) are then inserted into the appropriate one of retainers 10 by flexing hinge 104 to create a space between first portion 52 and second portion 54 of retainer front 12 and inserting the cables into the interior passage 22. The resiliency of the material from which retainer 10 is formed causes first split 50 to reclose when the force separating the first portion 52 from the second portion 54 is removed. Fastener element 62 may be used to releasably retain a complementary fastening element (not illustrated) of a door (not illustrated) mounted adjacent to retainer 10. Preferably, the material of retainer 10 is sufficiently rigid that retainer 10 can be used as a finger pull to move the object to which it is attached while hinge 104 provides the resiliency needed to allow first split 50 to be opened and closed. The modular nature of the retainer 10 also provides design flexibility as the upper and lower portions of retainer 10 can be modified individually. For example, bottom 16 may be used to support a different top 14, a top having longer front or rear portions, for example, to change the cross section of interior passage 22. Likewise, different bottoms 16 may be provide to mount to different substrates 106, ones having a different arrangement of mounting openings.

The present invention has been described herein in terms of presently preferred embodiments. However, additions and modifications to these embodiments will become apparent to those of ordinary skill in the relevant arts upon a reading of the foregoing description. It is intended that all such modifications and additions comprise a part of the present invention to the extent they fall within the scope of the several claims appended hereto.

What is claimed is:

1. An optical fiber retainer comprising:
   a first split band of material having a bottom, a top, a front and a back surrounding an interior passage through the first band from a first side of the first band to a second side of the first band, said front including a front first portion depending from said top and having a bottom edge facing away from said top and a front second portion extending from said bottom and including a top edge facing away from said bottom, the top edge and bottom edge comprising a first split of the first split band,
   said bottom including an inner surface comprising a wall of said interior passage and an outer surface facing away from said interior passage and said top including an inner surface comprising a wall of said interior passage and an outer surface facing away from said interior passage, and
   said bottom outer surface including a first connector element and said top outer surface including a second connector element configured to releasably mate with another connector element of another split band.

2. The optical fiber retainer of claim 1, wherein said bottom edge faces said top edge.

3. The optical fiber retainer of claim 2, wherein said bottom edge is spaced from said top edge.

4. The optical fiber retainer of claim 3 wherein said first portion overlaps said second portion.

5. The optical fiber retainer of claim 1, wherein said bottom inner surface is convex.

6. The optical fiber retainer of claim 1, wherein said bottom inner surface and said top inner surface are convex, and wherein said front includes a convex inner surface comprising a wall of said interior passage and said rear includes a convex inner surface comprising a wall of said interior passage.

7. The optical fiber retainer of claim 6 wherein said bottom edge includes one of a convex portion and a concave portion and said top edge includes the other of a convex portion and a concave portion complementary to said one of a convex portion and a concave portion.

8. The optical fiber retainer of claim 1 wherein said back includes a back first portion depending from said top and having a bottom edge facing away from said top and a back second portion extending from said bottom and including a top edge facing away from said bottom, the top edge and bottom edge of the back comprising a second split of the first split band, said back further including a first fastener element on said back first portion and a second fastener element on said back second portion complementary to said first fastener element and releasably connecting said back first portion to said back second portion.

9. The optical fiber retainer of claim 8 wherein said first fastener element comprises a first one of a projection and a receiver and the second fastener element comprises the other of said projection and said receiver, said receiver comprising an opening having a side wall and a slot in the side wall, and said projection including a flange extending into said slot.

10. The optical fiber retainer of claim 9 wherein said projection includes a first one of a boss and a hole and said receiver includes a second one of a boss and a hole and wherein said boss is received in said hole when said projection is in said receiver opening.

11. The optical fiber retainer of claim 1 wherein said first connector element comprises a first one of a tab and an opening and said second connector element comprises the other one of said tab and said opening.

12. The optical fiber retainer of claim 1 including a push-push fastener element on said front.

13. The optical fiber retainer of claim 1 including a female fastener element of a push-push fastener in said front first portion.

14. The optical fiber retainer of claim 1 wherein said first connector element comprises an L-shaped first tab having a first leg extending from said bottom outer surface and a second leg extending from said first leg and a second tab having a barb, and said second connector element comprises first and second spaced openings formed in said top outer surface.

15. The optical fiber retainer of claim 1 wherein said bottom edge includes one of a convex portion and a concave portion and said top edge includes the other of a convex portion and a concave portion complementary to said one of a convex portion and a concave portion.

16. The optical fiber retainer of claim 1 wherein said back comprises a hinge, said hinge being shiftable from a first configuration to a second configuration when a spacing between said top edge and said bottom edge is changed from a first distance to a second distance.

17. The optical fiber retainer of claim 1 including a second split band of material having a bottom, a top, a front and a back surrounding an interior passage through the second band from a front first side of the second band to a second side of the second band, said front including a first portion depending from said top and having a bottom edge facing away from said top and a front second portion extending from said bottom and including a top edge facing away from said bottom, the top edge and bottom edge comprising a first split of the second split band, said bottom including an inner surface comprising a wall of said interior passage and an outer surface facing away from said interior passage and said top including an inner surface comprising a wall of said interior passage and an outer surface facing away from said interior passage, said bottom outer surface including a first connector element and said top outer surface including a second connector element, said second split band's first connector element engaging said first split band's second connector element and connecting said first split band to said second split band.

18. An optical fiber retainer comprising:

a first split band of material having a bottom, a top, a front and a back surrounding an interior passage through the first band from a first side of the first band to a second side of the first band, said front including a front first portion depending from said top and having a bottom edge facing away from said top and a front second portion extending from said bottom and including a top edge facing away from said bottom, the top edge and bottom edge comprising a first split of the first split band, said back including a back first portion depending from said top and having a bottom edge facing away from said top and a back second portion extending from said bottom and including a top edge facing away from said bottom, the top edge and bottom edge of the back comprising a second split of the first split band, said back further including a first fastener element on said back first portion and a second fastener element on said back second portion complementary to said first fastener element and releasably connecting said back first portion to said back second portion, wherein said first fastener element comprises a first one of a projection and a receiver and the second fastener element comprises the other of said projection and said receiver, said receiver comprising an opening having a side wall and a slot in the side wall, and said projection including a flange extending into said slot.

19. The optical fiber retainer of claim 18 wherein said front first portion bottom edge includes one of a convex portion and a concave portion and said front second portion top edge includes the other of a convex portion and a concave portion complementary to said one of a convex portion and a concave portion.

20. The optical fiber retainer of claim 18, wherein the first fastener element and the second fastener element form a hinge permitting the first split between the front first portion bottom edge and the front second portion top edge to open and close.

21. An optical fiber retainer comprising:

first and second split bands of material each comprising:

a bottom, a top, a front and a back surrounding an interior passage through the band from a first side of the band to a second side of the band, said front including a first portion depending from said top and having a bottom edge facing away from said top and a second portion extending from said bottom and including a top edge facing away from said bottom, the top edge and bottom edge comprising a first split of the split band, said back including hinge means for changing a separation between said top edge and said bottom edge;

said bottom including an inner surface comprising a wall of said interior passage and an outer surface facing away from said interior passage and said top including an inner surface comprising a wall of said interior passage and an outer surface facing away from said interior passage, and connector means for releasably connecting said first split band top to said second split band bottom.

* * * * *